United States Patent [19]

Gasper

[11] Patent Number: 4,639,718
[45] Date of Patent: Jan. 27, 1987

[54] BOILER BLOWDOWN MONITORING SYSTEM AND PROCESS FOR PRACTICING SAME

[75] Inventor: Kenneth E. Gasper, Leawood, Kans.

[73] Assignee: Olin Corporation, Cheshire, Conn.

[21] Appl. No.: 705,179

[22] Filed: Feb. 25, 1985

Related U.S. Application Data

[63] Continuation-in-part of Ser. No. 595,776, Apr. 2, 1984.

[51] Int. Cl.⁴ ............................................. G08B 21/00
[52] U.S. Cl. .................................... 340/603; 210/85; 210/739; 340/540; 340/627; 340/679
[58] Field of Search ............... 340/679, 627, 603, 540; 210/696, 746, 739, 85

[56] References Cited

U.S. PATENT DOCUMENTS 4,509,618  4/1985  Kühn ................................... 340/679
4,544,489  10/1985  Campbell et al. .................... 210/739

OTHER PUBLICATIONS

Boiler Master System 1, Morr Control, Inc., Muskogee, Oklahoma 74401.
Model 250 Boiler TDS Control, Lakewood Instruments, Inc., Compton, CA 90220.
Boilermatic 300, Cambridge Scientific Industries, Cambridge, Maryland 21613.

Primary Examiner—Glen R. Swann, III
Attorney, Agent, or Firm—William A. Simons; Thomas P. O'Day

[57] ABSTRACT

A boiler blowdown monitoring system wherein the conductivity of the water in the boiler blowdown line is monitored to determine if it exceeds either a preset maximum or minimum level. The system includes a blowdown sensor, a blowdown valve, a blowdown controller and an interrogation means. The water conductivity is sensed by the sensor located on the blowdown line and transmitted to the interrogation means (e.g. microprocessor) through the boiler blowdown controller. If the sensor senses a water conductivity level above a preselected maximum conductivity level or below a preselected minimum conductivity level after a predetermined time period has passed since the boiler blowdown valve was opened, then an alarm signal is sent to the boiler operator.

4 Claims, 3 Drawing Figures

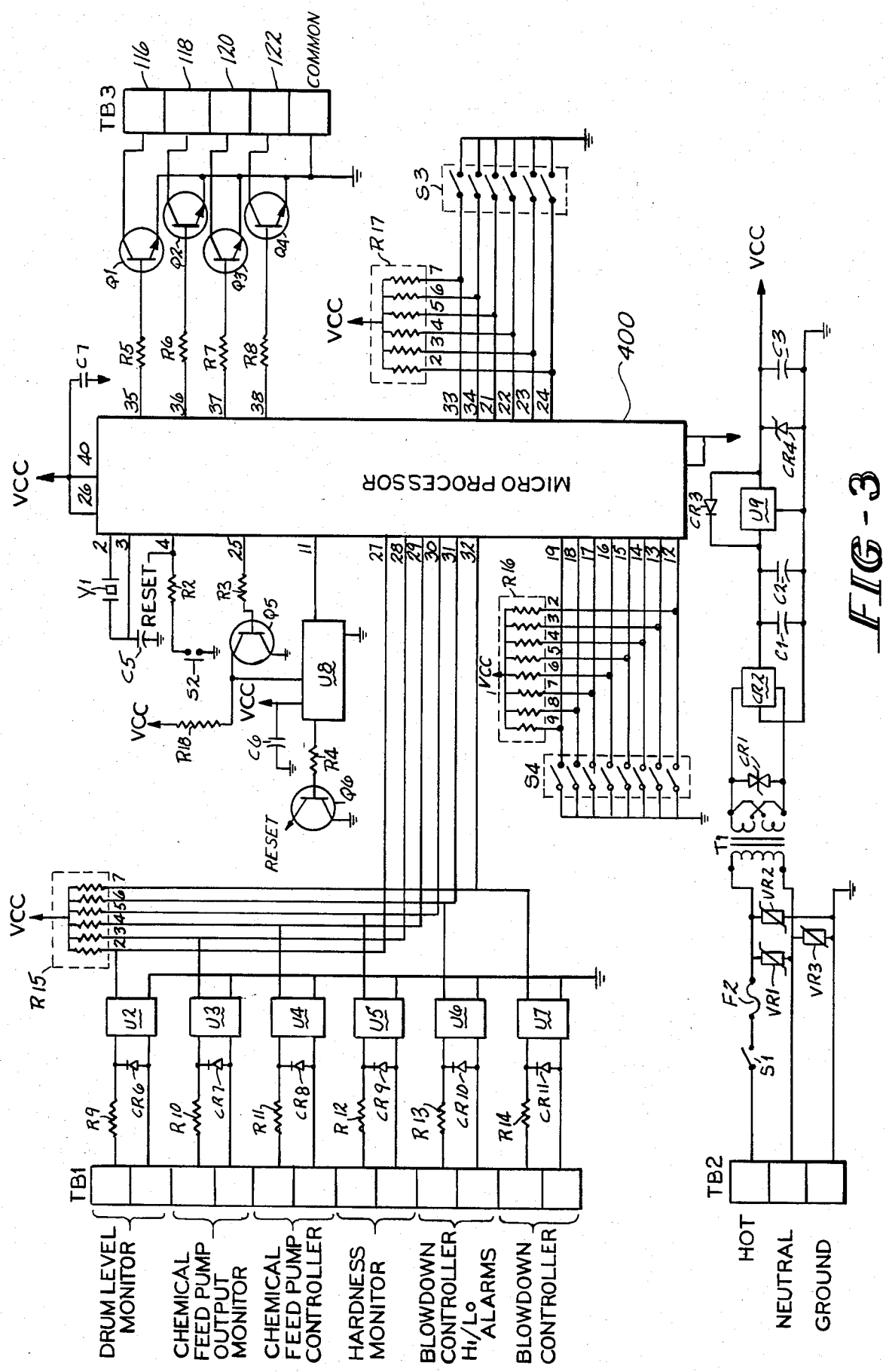

BOILER BLOWDOWN MONITORING SYSTEM AND PROCESS FOR PRACTICING SAME

CROSS-REFERENCES TO RELATED APPLICATIONS

This application is a continuation-in-part application to U.S. Patent application Ser. No. 595,776, filed on Apr. 2, 1984 by the same inventor.

BACKGROUND OF THE INVENTION

Field of the Invention

This invention relates to a selected boiler blowdown monitoring system and a process for practicing said system. More particularly, this invention relates to a boiler blowdown monitoring system which comprises a selected combination of a blowdown valve located in the boiler blowdown line; a blowdown sensor for sensing the conductivity of the water in the blowdown line; a blowdown controller capable of both sending electric signals to the blowdown valve and the blowdown sensor and receiving conductivity measurements from said sensor, as well as an interrogation means (e.g. a microprocessor) which is able to determine from said signals if and when an alarm signal should be sent to the operator. This monitoring system may be operated in conjunction with other chemical monitoring systems associated with the chemical treatment of a boiler to provide an overall boiler chemical monitoring system.

Description of the Prior Art

Blowdown valves are commonly employed in boiler systems to lower the concentration of dissolved minerals in the boiler water. When opened, these types of valves allow the removal of water concentrated with minerals. This removed water may be simultaneously replaced with fresh water containing low mineral concentrations. Mineral concentrations will build up with prolonged generation of steam from the boiler and may result in deposits forming on the boiler tubes or carryover of boiler water with the steam due to foaming of the boiler water. It should be noted that blowdown valves are normally in blowdown lines attached to both the steam drum and the bottom drum (mud drum) sections of a water tube boiler system or the single drum of a fire tube boiler.

In the water tube type of system, the blowdown valve on the steam drum is the one most frequently automated and its operation is often controlled by an electrical or mechanical controller device. The blowdown valve on the bottom drum or mud drum is employed to remove the buildup of precipitated solids that settle to the low point in the boiler. Because of insurance company restrictions, the blowdown valve on the mud drum may only be controlled manually.

The automatic controllers used in conjunction with the steam drum blowdown valves may be several types. One type of blowdown controller opens and closes the boiler blowdown valve on a programmed time interval basis. Thus, the controller periodically orders the blowdown valve to open for a predetermined amount of time. The controller may also simultaneously measure the conductivity of the boiler blowdown water, which is proportional to the dissolved mineral concentration level, and, if needed, may override the timer and hold the blowdown valve open for whatever additional time is needed to bleed the mineral concentration level down to the desired control level. One problem with this type of controller is that the operating conditions of the boiler may vary from one blowdown period to another blowdown period. For example, the boiler may be barely generating steam for a time period because of lack of demand and, therefore, boiler water concentrations will not cycle up to its most desirable operating level because too much water is removed during the timed blowdowns. In contrast, at other time periods the demand for steam from the boiler may be so great that the boiler operates at full capacity for a prolonged period of time. In such instances, the concentration of dissolved solids may rise to undesirably high levels that are not bled from the boiler fast enough to maintain a safe level. To overcome these operating variations, operators have adjusted the periods between blowdowns to make them closer together or further apart in order to compensate for changes in boiler load. However, this technique is very subjective and frequently may result in the loss of considerable sums of expensive heat energy as a result of excessive blowdown, or lead to the formation of scale on the boiler tubes, which reduces heat transfer efficiency, when the mineral concentrations go too high.

Another common problem associated with these types of control systems is that the measurement of conductivity of water is temperature dependent and thus varies with the temperature of the water. If a sensor is continuously monitoring the conductivity of water in the blowdown line, the resulting measurements will depend on whether the valve is open (i.e. hot water is running through the line past the sensor to raise the temperature to true boiler water temperature) or closed (i.e. the water in the line is stagnant and cools down and thereby provides lower conductivity reading).

Another potential problem of these types of conventional monitoring systems is that they are not able to control blowdowns if the blowdown valve fails. The valve may fail in either an open or closed position and the boiler may be severely damaged before the operator becomes aware of the condition.

The present invention provides a means for monitoring the blowdown system and for providing an immediate alarm when the conductivity of the water in the blowdown raises above or below a preselected range.

SUMMARY OF THE INVENTION

The present invention, therefore, is directed to a boiler blowdown monitoring system comprising:

(a) a boiler blowdown valve located in the boiler blowdown line for releasing boiler water during blowdown operation;

(b) a boiler blowdown sensor located in said blowdown line for sensing the conductivity of the water in said blowdown line;

(c) a boiler blowdown controller for generating first, second and third output signals;

(i) said first output signal is generated to said blowdown valve, said blowdown sensor and an interrogation means simultaneously when a predetermined condition exists and is capable of (aa) causing said blowdown valve to open to release water, (bb) causing said blowdown sensor to start sensing said water conductivity and to start tranferring water conductivity measurements to said controller, and (cc) causing said interrogation means to start an interrogation sequence;

(ii) said second output signal is generated to said blowdown valve, said blowdown sensor and said interrogation means simultaneously when said sensor senses a preselected first (optimum) conductivity level and is capable of (aa) causing said blowdown valve to close, (bb) causing said blowdown sensor to stop sensing and to stop transferring conductivity measurements to said controller, and (cc) causing said interrogation means to stop said interrogation sequence;

(iii) said third output signal is generated to said interrogation means when said sensor senses a conductivity level above a preselected second (maximum) conductivity level or below a preselected third (minimum) conductivity level;

(d) said interrogation means capable of sensing said first output signal, said second output signal, and said third output signal, and thereby cause an interrogation sequence to occur, said interrogation sequence comprising:

(i) when said third output signal is sensed after a predetermined time period following the sensing of said first output signal, then an alarm signal is generated to an alarm annunciating means;

(ii) when said third output signal is not sensed after a predetermined time period following the sensing of the first output signal, then no alarm signal is generated to an alarm annunciating means; and (iii) when said second output signal is sensed, then said interrogation sequence ends.

The present invention also is directed toward a process for monitoring a boiler blowdown operation, which comprises the steps of:

(a) generating a first output signal from a boiler blowdown controller to a boiler blowdown valve in a blowdown line, a boiler blowdown sensor in said blowdown line and an interrogation means simultaneously when a predetermined condition exists; said first output signal causing:

(i) said blowdown valve to open to release water from said blowdown line;

(ii) said blowdown sensor to start sensing the conductivity of the water in said blowdown line; and (iii) said interrogation means to start an interrogation sequence;

(b) transferring said water conductivity measurements from said blowdown sensor to said blowdown controller;

(c) generating a second output signal from said controller to said blowdown valve, said blowdown sensor and said interrogation means simultaneously when said water conductivity measurement is at a predetermined first (optimum) level, said second output signal causing:

(i) said blowdown valve to close and thereby stop water from leaving said blowdown line;

(ii) said blowdown sensor to stop sensing water conductivity; and (iii) said interrogation means to stop said interrogation sequence;

(d) generating a third output signal from said controller to said interrogation means when said water conductivity measurement exceeds a predetermined second (maximum) level or is below a predetermined third (minimum) level; said third output signal causing said interrogation means to generate an alarm signal to an alarm annunciation means if said third output signal is generated after a predetermined time period following said first output signal and before said second output signal.

BRIEF DESCRIPTION OF THE DRAWINGS

FIG. 3 is a schematic diagram of the microprocessor, input signal circuitry, time-delay switch circuitry, power supply circuitry, protection circuitry, open-/closed selector switch circuitry and output signal circuitry of the interface module.

DESCRIPTION OF THE PREFERRED EMBODIMENT

Figure 1:
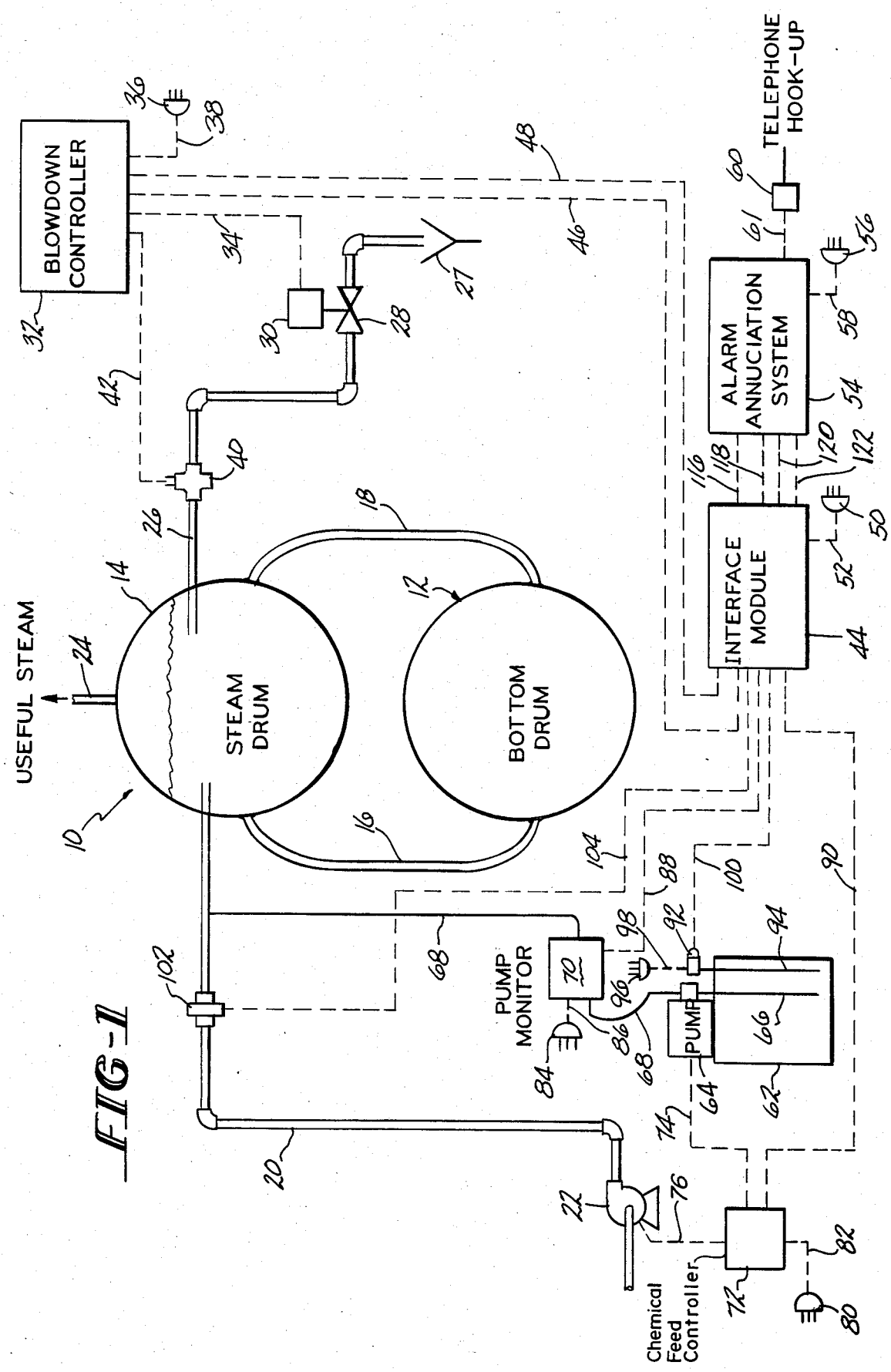
FIG. 1 is a schematic drawing of a preferred embodiment of the present invention.

FIG. 1 illustrates a preferred embodiment of the present invention as applied to a conventional water-tube boiler system 10. It may be noted that fire-tube boiler systems may also be equipped with the present monitoring system. Such conventional boiler systems include a bottom drum (also called a mud drum) 12 and a steam drum 14 which are connected by several downcomer tubes represented as 16 and several riser tubes represented as 18. Feedwater for this boiler system is fed into the steam drum 14 through feed line 20 by a boiler feedwater pump 22. Heat energy is applied to the riser tubes (generating tubes) 18 to create steam from this feedwater. The useful steam thus generated by this boiler system 10 exits by steam exit line 24. Steam drum 14 also has blowdown line 26 running from it which removes concentrated boiler water into a drain 27 or other disposal systems to keep the concentration of dissolved solids (minerals) in the boiler water from becoming too high. The amount of water removed through this blowdown line is controlled by means of a blowdown valve 28 run by a motor 30.

This blowdown valve is controlled by a standard boiler blowdown controller 32 which is connected to blowdown motor 30 by electrical connection 34. The following are typical examples of models and manufacturers of boiler blowdown controllers referred to in this invention.

1. Model "Boilermaster System 1" manufactured by Morr Controls Inc.—Muskagee, OK 74401.

2. Model "250" Boiler TDS Controller" manufactured by Lakewood Instruments, Inc.—Compton, CA 90220.

3. Model "Hydac Boiler-Matic 300" manufactured by Cambridge Scientific Industries—Combridge, MD 21613.

Valve motor 30 is activated by an electrical signal (first output signal) from controller 32. The motor then opens valve 28 to allow the flow of blowdown water. When controller sends another electric signal (second output signal) to motor 30, the motor closes valve 28 to stop the blowdown water flow. This controller is powered by a standard electrical power source through electrical connection plug 36 and electrical line 38.

Standard conductivity sensor 40 is also connected to controller 32 by electrical connection 42. Sensor 40 begins sensing the conductivity of the water in blowdown line 26 when controller sends an electric signal (first output signal) to it through connection 42. The conductivity measurements are sent back by sensor 40 through electrical connection 42. Sensor 40 stops sensing when it receives another electrical signal (second output signal) from controller 32. It should be noted that blowdown valve 28 opens and sensor 40 begins sensing simultaneously. Flowing water from the steam drum 14 past the sensor 40 is needed to obtain an accurate reading of conductivity. When the valve 28 is closed, the readings may not be accurate because the stagnant water in blowdown line 26 will start to cool and conductivity readings will vary with changes in temperature.

Boiler blowdown controller 32 may be programmed to send the signals to valve 28 to open and sensor 40 to start sensing at periodic time intervals. For example, it may be desirable to start the blowdown operation every 1 to 2 hours. A characteristic of the present invention is that the blowdown operation, while starting at periodic time intervals, will automatically vary the length of each operating period without the operator's attention.

Besides sending electrical signals to valve 28 and sensor 40, controller also sends electrical signals to interface module 44. These signals are sent by electrical connections 46 and 48. This interface module 44 is an interrogation means which starts an interrogation sequence upon receiving electrical signals. It is powered by a standard electric power source through electrical connection plug 50 and electrical power line 52. If the interrogation sequence indicates that a problem exists in the blowdown system, then interface module sends an alarm signal to alarm annunciation system 54. This alarm annunciation system is also powered by a standard electrical power source through electrical connection plug 56 and electrical power line 58. This alarm annunciation system 54 may be equipped with a telephone hook-up connection 60 by telephone line 61.

In operation, controller 32 simultaneously sends a first output electrical signal to valve motor 30 and sensor 40 as well as to interface module 44. The signal to motor 30 will open blowdown valve 28 to release boiler water down drain 27. Sensor 40 will begin to take conductivity measurements of water in blowdown line 26 and transfer those measurements back to controller 32. Interface module 44 will receive the first output signal through electrical connection 46 and start the interrogation sequence. After a predetermined amount of time has past (i.e. usually about 1 to 5 minutes) for the sensor 40 in blowdown line 26 to reach a high enough temperature to provide accurate conductivity measurements, interface module 44 may or may not receive another electrical signal (third output signal) from controller 32 through electrical connection 48. If the interface module 44 receives this third output signal, it is an indication that the water conductivity measurements from sensor 40 are above a pre-set maximum acceptable level or below a pre-set minimum acceptable level and therefore the interface module 44 will send an alarm signal to the alarm annunciation system 54. If no third output signal is received from controller 32 through electrical connection 48, no output from interface module 44 is sent to the alarm annunciation system 54. When the alarm annunciation system 54 is activated, the operator's attention is drawn to the controller 32 from which he can read the actual water conductivity measurement. He may then adjust the time period of the blowdown operation or manually override the controller. Such adjustments by the operator may be needed when there are sudden changes in demand on the boiler like process load changes, weather and the like. It should be noted that such operator adjustments made in conjunction with the monitoring system of the present invention are made immediately when the change in conditions occur rather than when the change in conditions are first noticed.

The monitoring system of this invention may be employed alone, as shown in FIG. 1, or with another monitoring system which monitors the feeding of a liquid solution of boiler treatment chemicals which are being fed into the boiler system 10.

In this second system, a liquid boiler treatment chemical solution is fed from drum 62 by positive displacement pump 64 through inlet pump line 66 and outlet pump line 68 and pump output monitor 70 into feedwater line 20. The operation of the pump 64 is controlled by a chemical feed controller 72 through electrical connection line 74. The chemical controller 72 may be any standard controller or control means normally employed for the controlling of chemical feed pumps. The controller 72 may be either a flow switch in feedwater line 20 or a timer which signals chemical feed pump 64 to operate at desired time intervals. More preferably, as shown in FIG. 1, the controller 72 responds to an electrical signal from feedwater pump 22 through electrical connection 76 and, in turn, signals chemical feed pump 64 through electrical line 74 to operate when the feedwater pump 22 is turned on. When a second electrical signal is received by the controller 72 from feedwater pump 22 indicating the latter has been turned off, the controller signals chemical feed pump 64 to turn off. The chemical controller 72 is powered by a standard electrical power source through electrical connection plug 80 and electric power connection 82.

Pump output monitor 70 may be any monitor which is capable of monitoring the output from a pump and includes a sensing means for sensing whether there is any output from the pump passing through output line 68 and a means for translating the presence or absence of that output into an electric signal which may be received and monitored remotely from the pump. A preferred pump output monitor is disclosed in co-pending patent application filed on Apr. 2, 1984 by Kenneth Gasper et al. and assigned to Olin Corporation and entitled "Postive Displacement Pump Output Monitor" (U.S. Pat. application Ser. No. 595,808). This application is incorporated herein by reference in its entirety. Pump output monitor 70 is powered by an electrical power source through electrical connection plug 84 and electrical connection 86.

Both pump output monitor 70 and chemical controller 72 are connected to interface module 44 through electrical connection 88 and 90, respectively. Each time the chemical controller comes on, calling for boiler chemical feed, an electrical signal is sent to pump 64 to turn ON. Also, an electric signal is sent to interface module 44 to initiate interrogation of the operation of the chemical feed pump output monitor 70. The interface module 44 awaits an electric signal from the pump output monitor 70 and if it does not receive such a signal within a predetermined amount of time, an alarm or fault signal is transmitted to alarm annunciation system 54. If that electric signal is received by the interface module 44 before that predetermined time period is up, then no alarm or fault signal is sent. Usually, a time-delay period of at least about 20 seconds is provided to allow for a loss of prime by the chemical pump and its normal self-priming. Preferably, time-delay periods from about 20 seconds to about 60 minutes are suitable for most operations.

The chemical level of drum 62 may also be monitored by this system. Chemical drum 62 has low level monitor 92 which has a liquid level sensor 94 attached thereto. This level monitor 92 is powered by an electrical power source with electrical connection plug 96 and electrical line 98. The level of the liquid in drum 62 as sensed by sensor 94 is translated into an electric signal through line 100 to interface module 44. When a low level is sensed, an electrical signal is sent through line 100 to the interface module 44. After an appropriate delay, the signal is passed on to the alarm annunciator 54. If the drum is checked before an alarm signal is given, a programmed time-delay in the interface module 44 gives an operator time to change drums independently without causing a fault alarm from being signalled. A time-delay from about 20 to 120 minutes should be suitable for most installations.

The system may also monitor the hardness of the feedwater. Standard hardness monitor 102 in feedwater line 20 measures the hardness of the fresh water going to the boiler. This monitor is connected to interface module 44 by electrical connection 104.

As can be seen from FIG. 1, interface module 44 has six input electrical signal lines going into it. Electrical line 100 carries electric signal for monitoring the drum levels. Electrical lines 46 and 48 carry electrical signals for monitoring the blowdown controller 32. These two electrical signals are integrated according to the present invention in the interface module 44. Electrical line 104 carries the electrical signal for monitoring the feedwater hardness sensor 102. Electrical lines 88 and 90 carry electrical signals from chemical pump monitor 70 and chemical pump controller 72, respectively. These two electrical signals are integrated according to the present invention in the interface module 44.

Interface module 44 has four output signal lines 116, 118, 120 and 122, which are connected to the alarm annunciation system 54. Line 116 represents the drum level monitor signal. Line 118 represents the integrated chemical feed pump/controller signal. Line 120 represents the Hardness Monitor input. Line 122 represents the integrated blowdown controller signal. Each of these output signals may be subjected to individually predetermined time-delays in the interface module 44 before being sent to the alarm annunciation system 54. The time-delays prevent false alarms from being sent.

The annunciation system 54 may be attached to telephone jack 60 by telephone line 61 so that the alarm signals may be automatically telephoned to operators at remote locations from the interface module 44 and alarm annunciation system 54.

Figure 2:
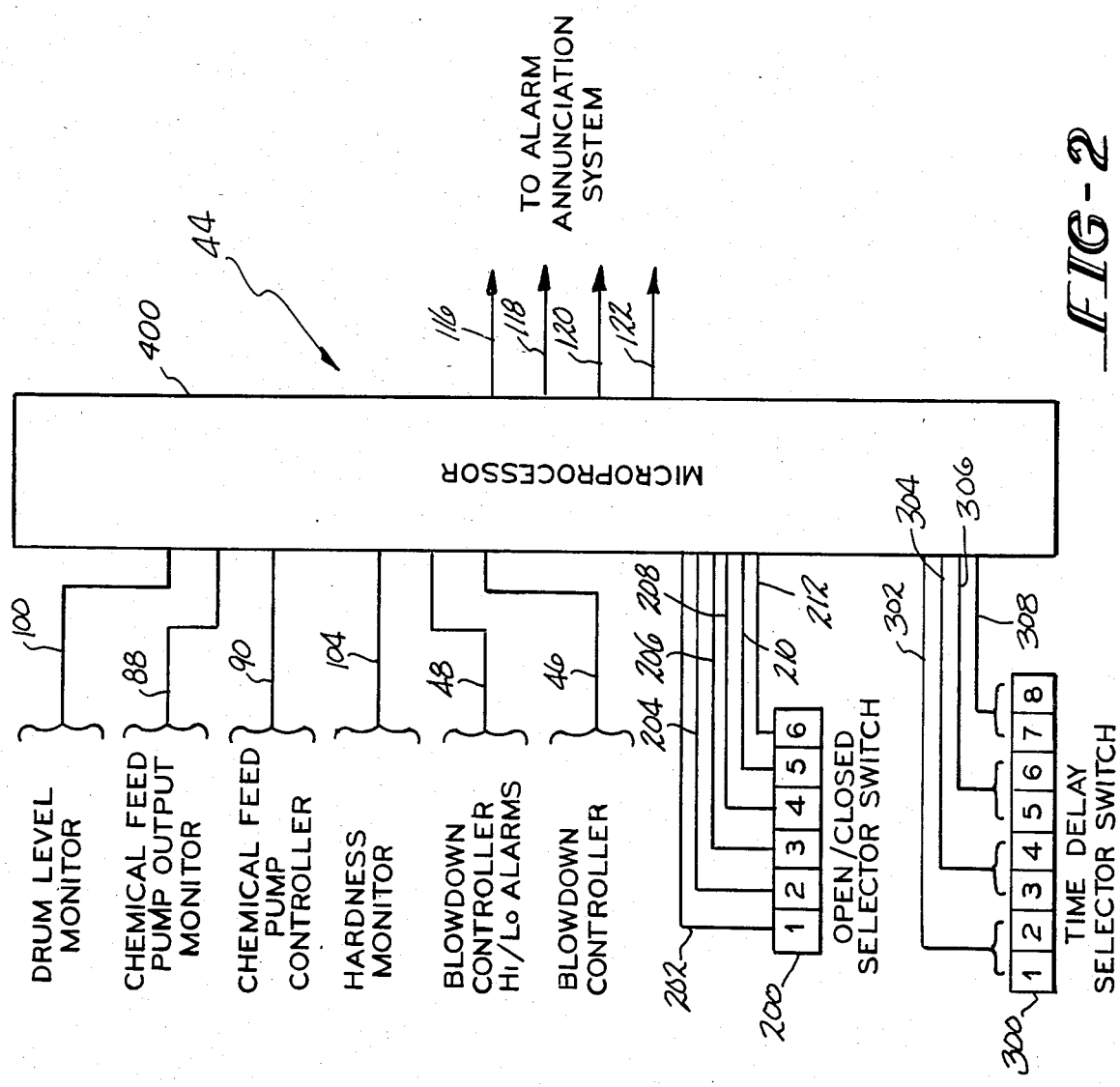
FIG. 2 is a schematic representation of input controls for an interface module employed as the integration means of the present invention.

FIG. 2 shows the input controls to interface module 44 where said module is a microprocessor 400 having external circuitry (i.e., open/closed selector switch 200 and time delay selector switch 300). These input controls include the six input wires 100, 88, 90, 104, 48 and 46 from the six above-mentioned process functions being monitored along with an open/closed selector switch panel 200 and a time-delay selector switch panel 300.

The open/closed selector switch panel allows these six input signals going into microprocessor 400 to be programmed as active when 115 VAC is applied or active when 115 VAC is absent. The active status for each signal may be selected with a rocker switch in the panel 200. Position 1 controls the Drum Level Monitor. Position 2 controls the Chemical Feed Pump Output Monitor. Position 3 controls the Chemical Feed Controller. Position 4 controls the Hardness Monitor. Positions 5 and 6 control the Blowdown Controller. These six switches are connected to the microprocessor 400 by electrical lines 202, 204, 206, 208, 210 and 212, respectively.

To select a channel to be active with 115 VAC applied, the switch position should be in the open position. To select a channel to be active without 115 VAC applied, the switch position should be in the closed position. Normally, the input from the Drum Level Monitor is in the Closed position and all of the others are in the Open position.

The time-delay selector switch panel 300 allows the interface module 44 to employ four different preprogrammed time-delay periods for each output signal to the alarm annunciation system. These four different time delays are selected by pairs of rocker switches in panel 300. Positions 1 and 2 provide the time delays for signals from the Drum Level Monitor. Positions 3 and 4 provide the time delays for the integrated signal from the Chemical Feed Controller/Pump Output Monitor. Positions 5 and 6 provide the time delays for the Hardness Monitor. Positions 7 and 8 provide the time delays for the integrated signal from the Blowdown Controller. The following Table 1 indicates the preferred time delays and their rocker switch settings.

Each pair of rocker switches are connected from panel 300 to microprocessor 400 by electrical connections 302, 304, 306 and 308, respectively.

TABLE 1

| | Time Delay Settings | | | | |
|---|---|---|---|---|---|
| Drum Level Monitor | Pos (1) | Pos (2) | Chemical Feed Controller/Pump | Pos (3) | Pos (4) |
| NO-DELAY | CLOSED | CLOSED | 3 min. | CLOSED | CLOSED |
| 15 min. | OPEN | CLOSED | 6 min. | OPEN | CLOSED |
| 30 min. | CLOSED | OPEN | 9 min. | CLOSED | OPEN |
| 45 min. | OPEN | OPEN | 12 min. | OPEN | OPEN |
| HARDNESS MONITOR | Pos (5) | Pos (6) | BLOWDOWN CONTROLLER | Pos (7) | Pos (8) |
| NO-DELAY | CLOSED | CLOSED | 60 sec. | CLOSED | CLOSED |
| 5 sec. | OPEN | CLOSED | 90 sec. | OPEN | CLOSED |
| 10 sec. | CLOSED | OPEN | 120 sec. | CLOSED | OPEN |
| 15 sec. | OPEN | OPEN | 180 sec. | OPEN | OPEN |

The most preferred settings of this water treatment application are 30 minutes for the Drum Level Monitor; 9 minutes for the Integrated Chemical Feed Controller/Pump; 10 seconds for Hardness Monitor and 90 seconds for Integrated Blowdown Controller. It should be noted that the length of time for time-delays is not limited to the preferred settings listed above. In different applications a DIP switch attached on the microprocessor 400 may be adjusted for each function to permit other preprogrammed time settings. The four output signal lines 116, 118, 120, and 122 are shown leaving microprocessor 400 to the alarm annunciation system (not shown in this FIG.).

FIG. 3 shows a preferred interface module and how it comprises a microprocessor with external circuitry. In the top left-hand corner is the input signal conditioning circuitry for the microprocessor 400. TB1 is a terminal barrier or strip having lead connections for the wires 100, 88, 90, 104, 48 and 46, respectively. The hot lead for each is on top and the common lead of each is on the bottom. Each input signal is conditioned by circuit comprising a resistor (R9 to R14), diode (CR6 to CR11) and a phototransistor (U2 to U7) having four leads. After this electrical conditioning, the input signals are passed into microprocessor 400 by wires 27, 28, 29, 30, 31 and 32. These wires are connected to a bank of six resistors R15 by wires 2, 3, 4, 5, 6 and 7.

At the bottom of FIG. 3 is the power input conditioning circuitry. Electrical power is supplied to the microprocessor 400 through terminal barrier or strip TB2. The current passes through on/off switch S1 and fuse F1 and through three Type L varistors VR1, VR2 and VR3 before entering power transformer T1. The partially conditioned input current is further conditioned through zener diode CR1 and bridge rectifier CR2, capacitors C1, C2 and C3, diodes CR3 and CR4 and power transistor U9.

The lower left hand side of the microprocessor 400 shows the time-delayed circuitry. S4 is an 8-rocker DIP switch which is attached to the microprocessor 400 by wires 12, 13, 14, 15, 16, 17, 18 and 19. These wires are also attached to a bank of 8 resistors R16 by wires 2, 3, 4, 5, 6, 7, 8 and 9. As mentioned above, the actual time-delay is programmed in the logic circuits within the microprocessor 400.

The open/closed selector switch circuitry is shown in the lower right hand side of microprocessor 400. The 6 rocker DIP switch S3 is attached to the microprocessor 400 by wires 33, 34, 21, 22, 23 and 24. These wires are also attached to a bank of 6 resistors R17 by wires 2, 3, 4, 5, 6 and 7.

The output signal wires 116, 118, 120 and 122 are sent from microprocessor 400 to the alarm annunciation system 54. The output signal conditioning circuitry is shown in upper right hand side of the microprocessor 400 as corresponding wires 35, 36, 37 and 38 attached to said microprocessor.

Terminal barrier or strip TB3 contains the leads for these output signal wires. Each output signal is conditioned by one of the resistors R5 to R8 and transistors Q1 to Q4, respectively.

The power input to the logic circuitry of microprocessor 400 is shown at the top of the microprocessor. This power input is shown as electrical connections 26 and 40 and includes capacitor C7. Protection circuitry is shown on the upper left-hand side of the microprocessor. Microprocessor crystal Y1 is connected to capacitor C5. Reset circuitry is shown with reset switch S2 and resistor R2. Also shown is the protection circuit having resistor R3, transistor Q5, resistor R18, COS-MOS integrated circuitry U8, capacitor C6, resistor R4 and transistor Q6. This protection circuitry is connected to the microprocessor 400 by electrical connections 2, 3, 4, 25 and 11.

In the exemplary circuits in FIG. 3, the values of the various circuit components may be as follows:

| | |
|---|---|
| Microprocessor 400 | Intel 8748 |

-continued

| | |
|---|---|
| Resistors R9 to R14 | 20K, 3W |
| Diodes CR6 to CR11 | IN 4004 |
| Phototransistors U2 to U7 | H11A1 |
| Bank of 6 Resistors R15 | 4.5K Dale-1-4726-8326 |
| Switch S1 | SK 7107 Switch |
| Fuse F1 | Y2 Amp |
| Type L Varistors VR1 to VR3 | GEV150LA10A |
| Signal Transformer T1 | ST-4-16 |
| Zener diode CR1 | 1.5KE62C |
| Bridge Rectifier CR2 | VM28 |
| Capacitor C1 | 1000 microfarads |
| Capacitor C2 | 0.1 microfarads |
| Power Transistor U9 | TO-220AB |
| Diode CR3 | IN4816 |
| Rocker DIP Switch 54 | Type 76-SB08 |
| Bank of 8 Resistors R16 | 10K Dale 1-036-8329 |
| Rocker DIP Switch 53 | Type 76-SB06 |
| Bank of 6 Resistors | 10K Dale-1-1036-8334 |
| Resistors R5 to R8 | 1K |
| Transistors Q1 to Q4 | PN2222A |
| Capacitor C7 | 0.1 microfarad |
| Microprocessor crystal Y1 | 6 Mhz |
| Capacitor C5 | 20 pf |
| Resistor R2 | 1K |
| Reset Switch S2 | 1A-120VAC CNK-T12 |
| Resistor R3 | 4.7 resistor |
| Transistor Q5 | PN2222A |
| Resistor R18 | 20K |
| COS-MOS Integrated Circuitry U8 | RCA CD4020 |
| Capacitor C6 | 0.1 microfarad |
| Resistor R4 | 1K |
| Transistor Q6 | PN2222A |

The present invention has numerous advantages associated with it. The equipment employed is inexpensive and easy to set up. Standard controllers and alarm annunciation equipment is used. The invention allows for continuous monitoring without the presence of a human operator nearby. With a multiple automatic telephone hookup, the alarm annunciation equipment is able to ensure that the appropriate person will be notified as soon as a fault is detected, thus avoiding costly water chemistry upsets. The length of time between personal inspections to on-site locations can be lengthened.

What is claimed is:

1. A process for monitoring a boiler blowdown operation, which comprises the steps of:
    (a) generating a first output signal from a boiler blowdown controller to a boiler blowdown valve in a blowdown line, a boiler blowdown sensor in said blowdown line and an interrogation means simultaneously when a predetermined condition exists; said first output signal causing:
        (i) said blowdown valve to open to release water from said blowdown line;
        (ii) said blowdown sensor to start sensing the conductivity of the water in said blowdown line; and
        (iii) said interrogation means to start an interrogation sequence; ring said water conductivity measurements
    (b) transferring said water conductivity measurements from said blowdown sensor to said blowdown controller;
    (c) generating a second output signal from said controller to said blowdown valve, said blowdown sensor and said interrogation means simultaneously when said water conductivity measurement is at a predetermined first (optimum) level, said second output signal causing:
        (i) said blowdown valve to close and thereby stop water from leaving said blowdown line;

(ii) said blowdown sensor to stop sensing water conductivity; and (iii) said interrogation means to stop said interrogation sequence;

(d) generating a third output signal from said controller to said interrogation means when said water conductivity measurement exceeds a predetermined second (maximum) level or is below predetermined third (minimum) level; said third output signal causing said interrogation means to generate an alarm signal to an alarm annunciation means if said third output signal is generated after a predetermined time period following said first output signal and before said second output signal.

2. The process of claim 1 wherein step (a) occurs only after the elapse of a preselected amount of time from the generation of the previous first output signal.

3. A boiler blowdown monitoring system comprising:

(a) a boiler blowdown valve located in a boiler blowdown line for releasing boiler water during blowdown operation;

(b) a boiler blowdown sensor located in said blowdown line for sensing the conductivity of the water in said blowdown line;

(c) a boiler blowdown controller for generating first, second and third output signals;

(i) said first output signal being generated to said blowdown valve, said blowdown sensor and an interrogation means simultaneously when a predetermined condition exists and being capable of (aa) causing said blowdown valve to open to release water, (bb) causing said blowdown sensor to start sensing said water conductivity and to start tranferring water conductivity measurements to said controller, and (cc) causing said interrogation means to start an interrogation sequence;

(ii) said second output signal being generated to said blowdown valve, said blowdown sensor and said interrogation means simultaneously when said sensor senses a preselected first (optimum) conductivity level and being capable of (aa) causing said blowdown valve to close, (bb) causing said blowdown sensor to stop sensing and to stop transferring conductivity measurements to said controller, and (cc) causing said interrogation means to stop said interrogation sequence;

(iii) said third output signal being generated to said interrogation means when said sensor senses a conductivity level above a preselected second (maximum) conductivity level or below a preselected third (minimum) conductivity level;

(d) said interrogation being capable of sensing said first output signal, said second output signal, and said third output signal, and capable of performing an interrogation sequence, said interrogation sequence comprising:

(i) waiting a predetermined time period after the sensing of said first output signal, then generating an alarm signal to an alarm annunciating means if said third output signal is sensed; and (ii) ending said interrogation sequence when said second output signal is sensed.

4. The monitor system of claim 3 wherein said interrogation means is an interface module comprising a microprocessor capable of receiving said first, second and third output signals, time-delay switch circuitry to determine the predetermined time period from the first output signal before said interrogation sequence begins, and an open/closed selector switch circuitry to determine the active status of said output signals.

* * * * *